(12) United States Patent
Watson et al.

(10) Patent No.: US 7,701,172 B2
(45) Date of Patent: Apr. 20, 2010

(54) POWER DRIVER AND CHARGER WITH FLEXIBLE MOUNTING SYSTEM FOR BATTERY PACK

(75) Inventors: James B. Watson, Fallston, MD (US); Danh Trinh, Parkville, MD (US); Alan Phillips, Jackson, TN (US); Daniel P. Wall, Humboldt, TN (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/218,561

(22) Filed: Sep. 6, 2005

(65) Prior Publication Data
US 2006/0091852 A1 May 4, 2006

Related U.S. Application Data

(63) Continuation-in-part of application No. 10/962,583, filed on Oct. 13, 2004, now abandoned, and a continuation-in-part of application No. 10/929,333, filed on Aug. 30, 2004, now abandoned.

(60) Provisional application No. 60/510,122, filed on Oct. 14, 2003.

(51) Int. Cl.
*H02J 7/00* (2006.01)

(52) U.S. Cl. .................. 320/114; 320/107; 320/110; 320/113; 81/52

(58) Field of Classification Search .......... 320/106, 320/110, 107, 111–115; 429/99, 100; 439/115, 439/352, 500, 929; 310/50; 81/52
See application file for complete search history.

(56) References Cited

U.S. PATENT DOCUMENTS

| | | | | |
|---|---|---|---|---|
| 4,303,876 A | * | 12/1981 | Kelly et al. ............ | 320/110 |
| 5,148,094 A | * | 9/1992 | Parks et al. ............ | 320/110 |
| 5,259,786 A | * | 11/1993 | Huang ................ | 439/500 |
| 5,752,205 A | * | 5/1998 | Dzung et al. .......... | 455/575.1 |
| 6,007,939 A | | 12/1999 | Clowers | |
| 6,160,389 A | * | 12/2000 | Watts ................ | 323/282 |
| 6,204,632 B1 | * | 3/2001 | Nierescher et al. ...... | 320/116 |
| 6,563,290 B2 | * | 5/2003 | Sakakibara et al. ..... | 320/106 |
| 6,615,930 B2 | * | 9/2003 | Bongers-Ambrosius et al. ................ | 173/198 |
| 6,621,246 B2 | * | 9/2003 | Kubale et al. .......... | 320/112 |
| 6,656,626 B1 | * | 12/2003 | Mooty et al. .......... | 429/99 |
| 6,876,173 B2 | * | 4/2005 | Mastaler et al. ........ | 320/114 |
| 7,030,590 B2 | * | 4/2006 | Sakakibara et al. ..... | 320/112 |

(Continued)

OTHER PUBLICATIONS

ISR dated Jul. 14, 2005.

*Primary Examiner*—Edward Tso
*Assistant Examiner*—Arun Williams
(74) *Attorney, Agent, or Firm*—Harness, Dickey & Pierce, P.L.C.

(57) ABSTRACT

A power tool may include a housing that supports an electrical circuit. The electrical circuit may include at least two terminal sets that are arranged in parallel to each other. The at least two terminal sets may include a first terminal set configured for engagement along a first axis to a battery pack having a first configuration and a second terminal set configured for engagement along a second axis to a battery pack having a second, different configuration. A battery charger may include a housing, and an interface that is electrically and mechanically compatible with at least two battery packs having different configurations and battery cell chemistries.

20 Claims, 10 Drawing Sheets

U.S. PATENT DOCUMENTS

2002/0125857 A1* 9/2002 Mastaler et al. ............. 320/112
2002/0175659 A1* 11/2002 Sakakibara ................. 320/150
2005/0058890 A1* 3/2005 Brazell et al. ................. 429/99
2006/0222931 A1* 10/2006 Lin ........................... 429/100

* cited by examiner

POWER DRIVER AND CHARGER WITH FLEXIBLE MOUNTING SYSTEM FOR BATTERY PACK

CROSS REFERENCE TO RELATED APPLICATIONS

This application is a Continuation-In-Part Application of (1) U.S. application Ser. No. 10/929,333 filed on Aug. 30, 2004, now abandoned, and (2) U.S. application Ser. No. 10/962,583 filed on Oct. 13, 2004, now abandoned, which claims priority under 35 USC §119 to U.S. Provisional Application No. 60/510,122 filed on Oct. 14, 2003, the entire contents of all of which are incorporated herein by reference.

BACKGROUND

1. Field of the Invention

Example embodiments of the present invention relates in general to power drivers, and more particularly to a system for mounting a battery pack, which may be implemented on a power driver or a battery charger.

2. Description of Related Art

Cordless power drivers may be energized by electricity from battery packs. The housing of the power driver and/or the housing of a battery charger may be designed to accommodate a specific battery pack. To this end, each of the power driver and the battery charger may have an interface that interacts with a corresponding interface of the battery pack to provide appropriate electrical and mechanical interconnections.

Two conventional interfaces include a "tower" interface and a "rail" interface. When the tower interface is employed, the power driver housing may include a cavity, and housing terminals may be provided in the bottom of the cavity. Here, a portion of the battery pack may be inserted into the cavity of the housing so that battery terminals (which may be provided on a nose portion of the battery pack) electrically connect to the housing terminals. The power driver housing may also include features cooperating with a latch mechanism of the battery pack so as to releasably retain the battery pack, as is well known in this art.

When the rail interface is employed, the power driver housing may include opposed grooves and support housing terminals. Here, rails of the battery pack may be inserted into the grooves of the housing so that battery terminals electrically connect to the housing terminals. The power driver housing may also include a latch mechanism that cooperates with a feature of the battery pack so as to releasably retain the battery pack, as is well known in this art.

Although conventional interfaces of a power driver and a battery charger are generally thought to be acceptable, they are not without shortcomings. For example, the power driver and the battery charger may accommodate only a single battery pack mounting configuration. To address this shortcoming, adapters have been developed that may allow a power tool specifically designed for a first type of mounting configuration to accommodate a battery pack suitable for a second type of mounting configuration. However, adapters may become lost, may require cumbersome manipulations, and may be associated with other inconveniences.

SUMMARY

In an example embodiment of the invention, a power driver may include a housing. An electrical circuit may be supported by the housing. The electrical circuit may include at least two terminal sets that are arranged in parallel to each other. The at least two terminal sets may include a first terminal set configured for engagement along a first axis to a battery pack having a first configuration, and a second terminal set configured for engagement along a second axis to a battery pack having a second configuration.

In another example embodiment of the invention, a power driver may include a housing. An electrical circuit may be supported by the housing. The power driver may include an interface having a first interface portion configured for engagement along a first axis to a battery pack having a first configuration, and a second interface portion configured for engagement along a second axis to a battery pack having a second configuration.

In another example embodiment of the invention, a cordless drill may include a housing. An electrical circuit may be supported by the housing. The electrical circuit may include a motor, a first terminal set electrically coupled to the motor and configured for engagement along a first axis to a battery pack having a first configuration, and a second terminal set electrically coupled to the motor and configured for engagement along a second axis to a battery pack having a second configuration.

In another example embodiment of the invention, a battery charger may include a housing and an interface. The interface may include a tower interface portion with a first terminal set that is electrically compatible with a tower battery pack having one of nickel-cadmium battery cells and nickel-metal-hydride battery cells. The interface may also include a rail interface portion with a second terminal set that is electrically compatible with a rail battery pack having lithium ion battery cells.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

BRIEF DESCRIPTION OF THE DRAWINGS

The present invention will become more fully understood from the detailed description below and the accompanying drawings, wherein like elements are represented by like reference numerals, which are given by way of illustration only and thus are not limiting of the present invention.

DETAILED DESCRIPTION OF EXAMPLE, NON-LIMITING EMBODIMENTS

I. Example Circuit Diagram

FIG. 1

Figure 1:
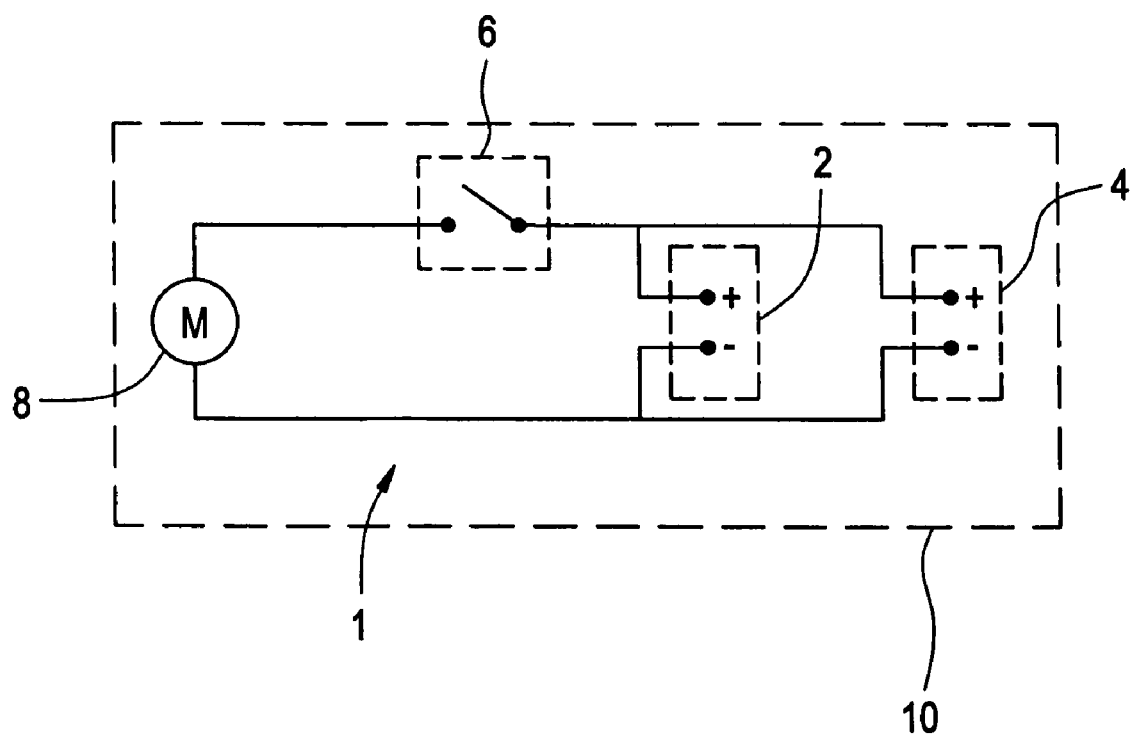
FIG. 1 is a circuit diagram of power tool components according to an example, non-limiting embodiment of the present invention.

FIG. 1 is a schematic diagram of an example circuit 1 that may electrically interconnect the various components of the power driver. As shown, the housing 10 of the power driver may support, for example, a motor 8, two terminal sets 2, 4, and a switch 6. Additional components and/or circuitry, which are conventional in this art, may also be implemented. Such additional components/circuitry have been omitted from FIG. 1 for clarity of illustration.

The motor 8 may be carried by the housing 10. The motor 8 may be mechanically coupled (and drive) the tool via a transmission (not shown), as is well known in this art. The motor 8 may be selectively powered up (assuming a battery pack is provided) via actuating a switch 6. The switch 6 may be actuated via manipulating a trigger (for example) provided on the housing 10, as is well known in this art.

The housing 10 may support two terminals sets 2, 4. The circuit architecture may be such that the terminal sets 2, 4 may be arranged in a parallel fashion. That is, each of the terminal sets 2, 4 may be electrically connected to the same nodes of the circuit 1. The terminal sets 2, 4 may be operatively engageable with respective battery packs that may have different configurations (from a structural and/or electrical standpoint). For example, one terminal set 2 may be located for engagement with the battery terminals of a battery pack having a first configuration, while the other terminal set 4 may be located for engagement with the battery terminals of a battery pack having a second, different configuration. In this example embodiment, only one of the terminal sets 2, 4 may be electrically connected to a battery pack at a given time.

Each terminal set 2, 4 may include a positive terminal and a negative terminal, as shown in FIG. 1. However, the invention is not limited in this regard. For example, each terminal set 2, 4 may include a plurality of positive terminals and a plurality of negative terminals. Further, the number of terminals in one terminal set may be the same as or different than the number of terminals in the other terminal set. The invention is not limited to a terminal having a particular structure. Numerous and varied terminal structures, which are well known in this art, may be suitably implemented. Although two terminal sets 2, 4 are illustrated in FIG. 1, the invention is not limited in this regard. For example, more than two terminal sets may be suitably implemented.

II. Example Power Driver

FIGS. 2-4

Example embodiments of the present invention may be implemented in a power driver (e.g., a drill) for driving a tool (e.g., a drill bit). The invention is not, however, limited in this regard since it may be suitably implemented in a variety of power drivers (other than drills) for driving a variety of tools (other than drill bits). By way of example only, power drivers may include a circular saw, a drill, a flashlight, a reciprocating saw, a jig saw, a radio, a chain saw, etc.

Figure 2:
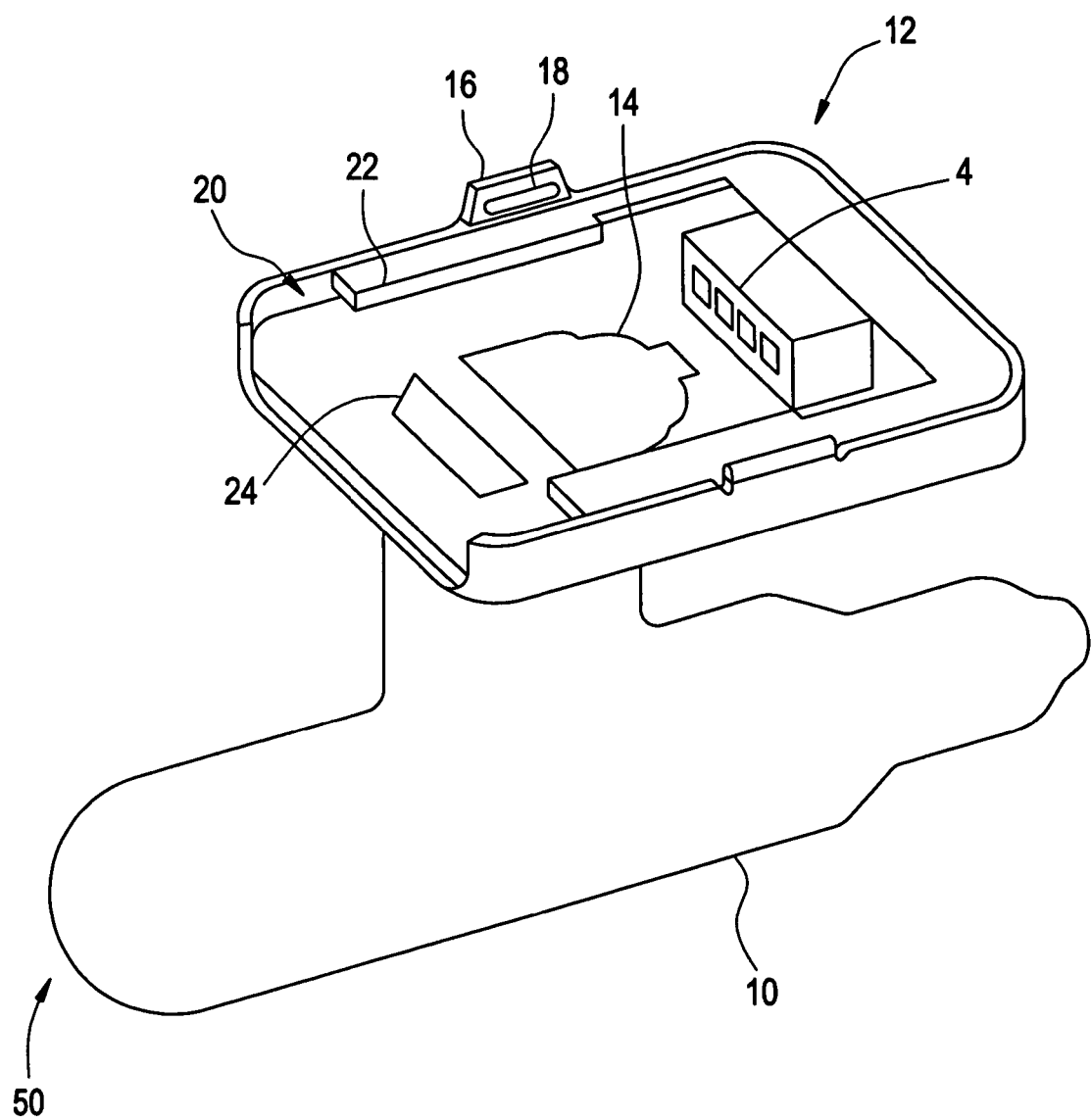
FIG. 2 is a schematic view of a power driver with a flexible mounting feature according to an example, non-limiting embodiment of the present invention.

FIG. 2 is a perspective view of an example power driver 50 having a housing 10. The housing 10 may have an interface 12 that facilitates interconnections (both mechanically and electrically) with battery packs having alternative configurations. To this end, and by way of example only, the interface 12 may include a combination of a tower interface portion and a rail interface portion. It will be appreciated that the invention is not limited in this regard as combinations of numerous, alternative interface portions may be suitably implemented. Each of the two interface portions is discussed separately below. Further, in this example embodiment, the interface 12 may be provided without utilizing an adapter.

A. The Tower Interface Portion:

The tower interface portion may include a cavity 14 provided in the housing 10, and the terminal set 2 (hidden from view in FIG. 2) may be provided in the bottom of the cavity 14. The housing may also include clips 16. Each clip 16 may include an aperture 18.

Figure 3:
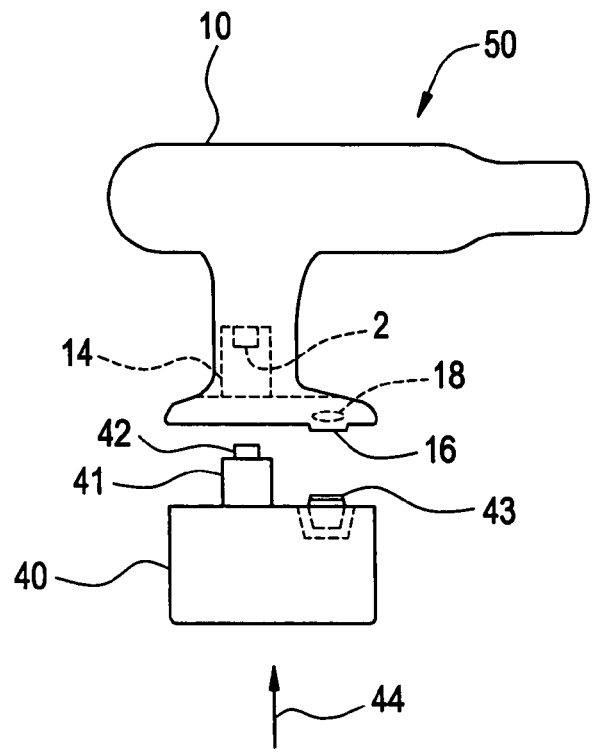
FIGS. 3 and 4 are schematic views the manner in which a power driver may interact with respective battery packs according to an example, non-limiting embodiment of the present invention.

The tower interface portion may accommodate a battery pack having a tower configuration, as shown in FIG. 3. Here, the battery pack 40 may include a nose portion 41. A battery terminal set 42 may be provided on the nose portion 41. The battery pack 40 may also include a latch mechanism 43.

The battery pack 40 may be moved in a tower inserting direction 44 so that the nose portion 41 may enter into the cavity 14 of the housing 10. The nose portion 41 may move far enough into the cavity 14 so that the battery terminal set 42 engages with the terminal set 2 provided on the housing 10. In this way, the battery pack 40 may become electrically connected (via the terminal set 2) to the example circuit depicted in FIG. 1.

Further, the latch mechanism 43 may engage with the clips 16 so that the housing 10 may releasably retain the battery back 40, as is well known in this art. For example, the latch mechanism 43 may be spring loaded so as to engage the opening 18 when the battery pack 40 is mounted on the housing 10. Removal of the battery pack 40 may be prevented until the spring bias of the latch mechanism 43 is overcome, for example, by an operator depressing a button of the latch mechanism 43.

In FIG. 3, the rail interface portion (discussed below in section II.B.) is not shown for clarity of illustration. It will be appreciated, however, that the rail interface portion is present in this example embodiment.

B. The Rail Interface Portion:

Turning back to FIG. 2, the rail interface portion may include a pair of grooves 20 respectively defined by rails 22 of the housing 10. The grooves 20 may confront each other as shown in FIG. 2. The terminal set 4 may be provided in the housing 10 toward the longitudinal ends of the grooves 20. The housing 10 may also include a latch mechanism 24.

Figure 4:
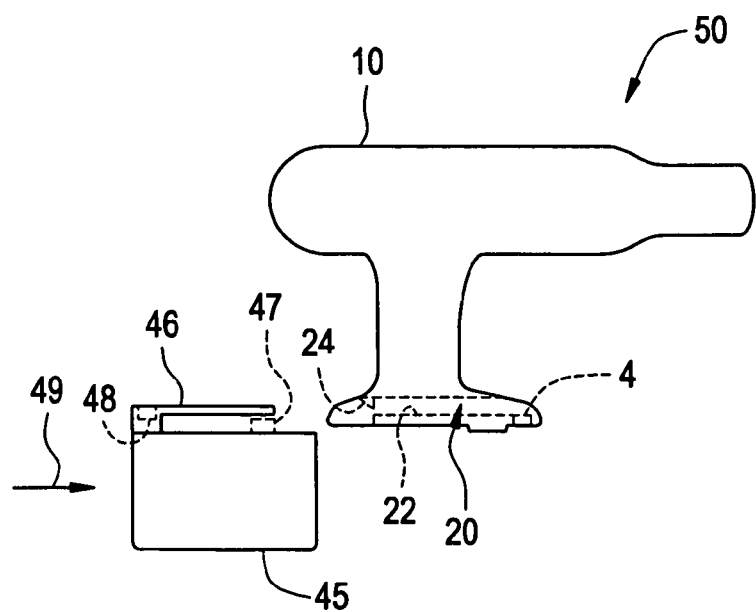

The rail interface portion may accommodate a battery pack having a rail configuration, as shown in FIG. 4. Here, the battery pack 45 may include a pair of guide rails 46. A battery terminal set 47 may be provided on a surface of the battery pack 45. The battery pack 45 may also include a recess 48.

The battery pack 45 may be moved in a rail inserting direction 49 so that the guide rails 46 may enter into the grooves 20 of the housing 10. The battery pack 45 may move far enough in the rail inserting direction 49 so that the battery terminal set 47 engages with the terminal set 4 provided on the housing 10. In this way, the battery pack 45 may become electrically connected (via the terminal set 4) to the example circuit depicted in FIG. 1.

Further, the latch mechanism 24 may engage with the recess 48 so that the housing 10 may releasably retain the battery back 45, as is well known in this art. For example, the latch mechanism 24 may be spring loaded so as to engage the recess 48 when the battery pack 45 is mounted on the housing 10. Removal of the battery pack 45 may be prevented until the spring bias of the latch mechanism 24 is overcome, for example, by an operator depressing a button of the latch mechanism 24.

In FIG. 4, the tower interface portion (discussed above in section II.A.) is not shown for clarity of illustration. It will be appreciated, however, that the tower interface portion is present in this example embodiment.

In this example embodiment, when the tower battery pack 40 is installed, the terminal set 2 may be active and the terminal set 4 may be inactive. That is, when the driver 50 is powered up, current may flow through the terminal set 2, but not through the terminal set 4. And when the battery pack 45 is installed, the terminal set 4 may be active and the terminal set 2 may be inactive. That is, when the driver 50 is powered up, current may flow through the terminal set 4, but not through the terminal set 2.

In this example embodiment, the tower inserting direction 44 and the rail inserting direction may be perpendicular to each other, as will be appreciated by comparing FIGS. 3 and 4. However, the invention is not limited in this regard. For example, the interface of the housing may accommodate battery packs having different configurations that may be inserted in a same insertion direction.

Further, the invention is not limited to the structural and functional details of the tower interface portion and rail interface portion discussed above with reference to FIGS. 3 and 4. For example, and with reference to FIG. 3, the respective locations of the latch mechanism 43 and the clips 16 may be reversed. Similarly, and with reference to FIG. 4, the respective locations of the latch mechanism 24 and the recess 48 may be reversed. Further, numerous and alternative conventional mechanisms may be suitably implemented to releasably retain the battery packs on the housing of the power driver.

III. Example Power Driver

FIG. 5

In another example embodiment, the power driver may have an interface that may accept (individually) two or more battery packs having different tower configurations that may be inserted in a same insertion direction.

Figure 5:
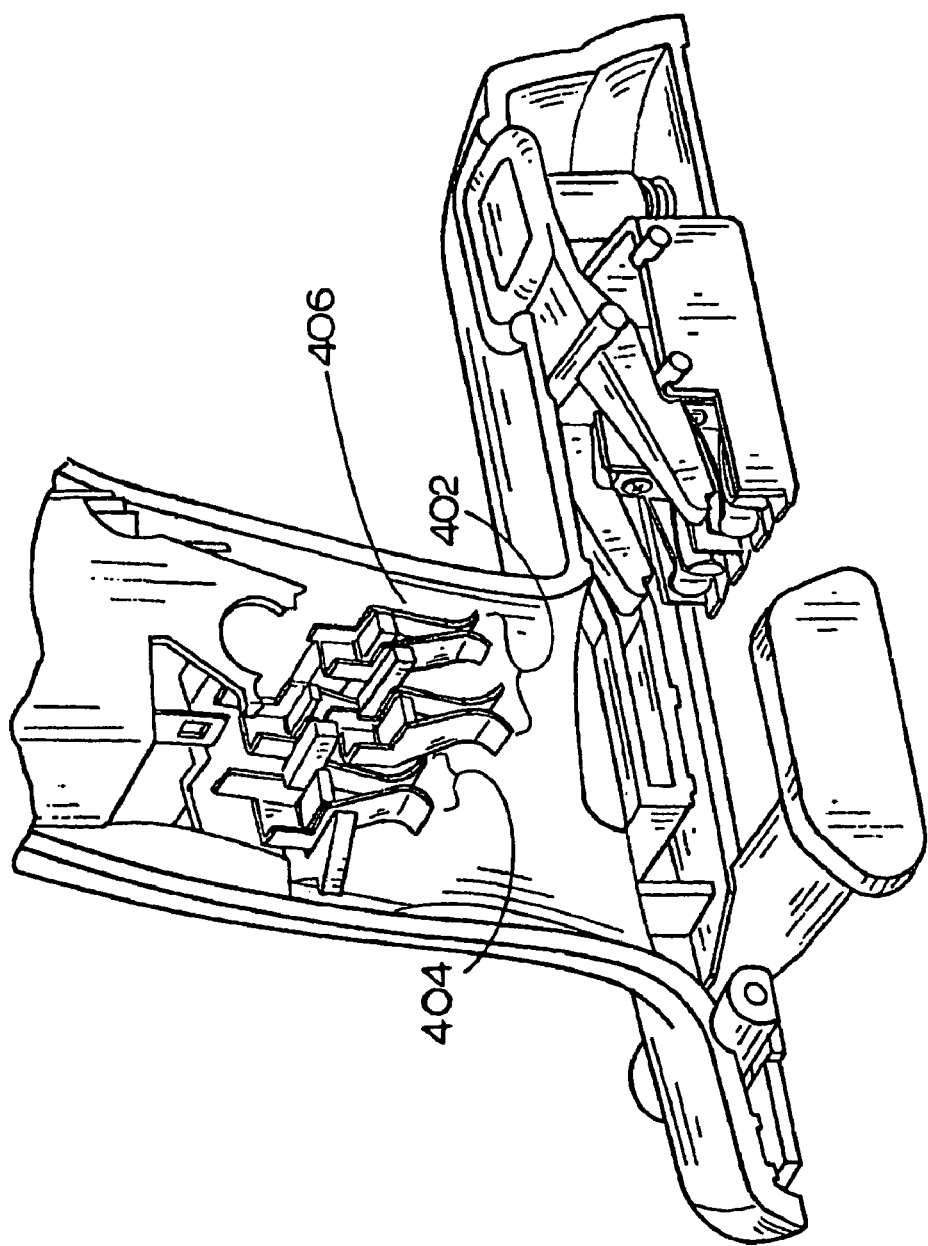
FIG. 5 is a schematic view of a power driver with a flexible mounting feature according to another example, non-limiting embodiment of the present invention.

As illustrated in FIG. 5, a first terminal set 402 and a second terminal set 404 may be disposed in a cavity 406 of the power driver housing. In this way, the power driver may accept two configurations of tower type battery packs. By way of example only, the first terminal set 402 may be disposed toward one side of the cavity 406 while the second terminal set 404 may be disposed on an opposite side of the cavity 406 such that the first terminal set 402 does not interfere with the reception of a battery pack by the second terminal set 404 (and vice versa).

In the example embodiment depicted in FIG. 5, another terminal set may be provided on the power driver housing to allow for connection to a rail type battery pack.

IV. Example Power Driver

FIGS. 6A-6E

In another example embodiment, the power driver may accept battery packs having alternative configurations and may implement an adjustable terminal set 300.

As shown in FIGS. 6A-6E, a terminal set 300 may be adjustably coupled to the power driver housing 302. For instance, the terminal set 300 may be for interconnecting with a rail type battery pack. The terminal set 300 may be adjustably mounted to the housing 302 to permit insertion of a tower type battery pack into a cavity 308 of the housing 302.

Figure 6A:
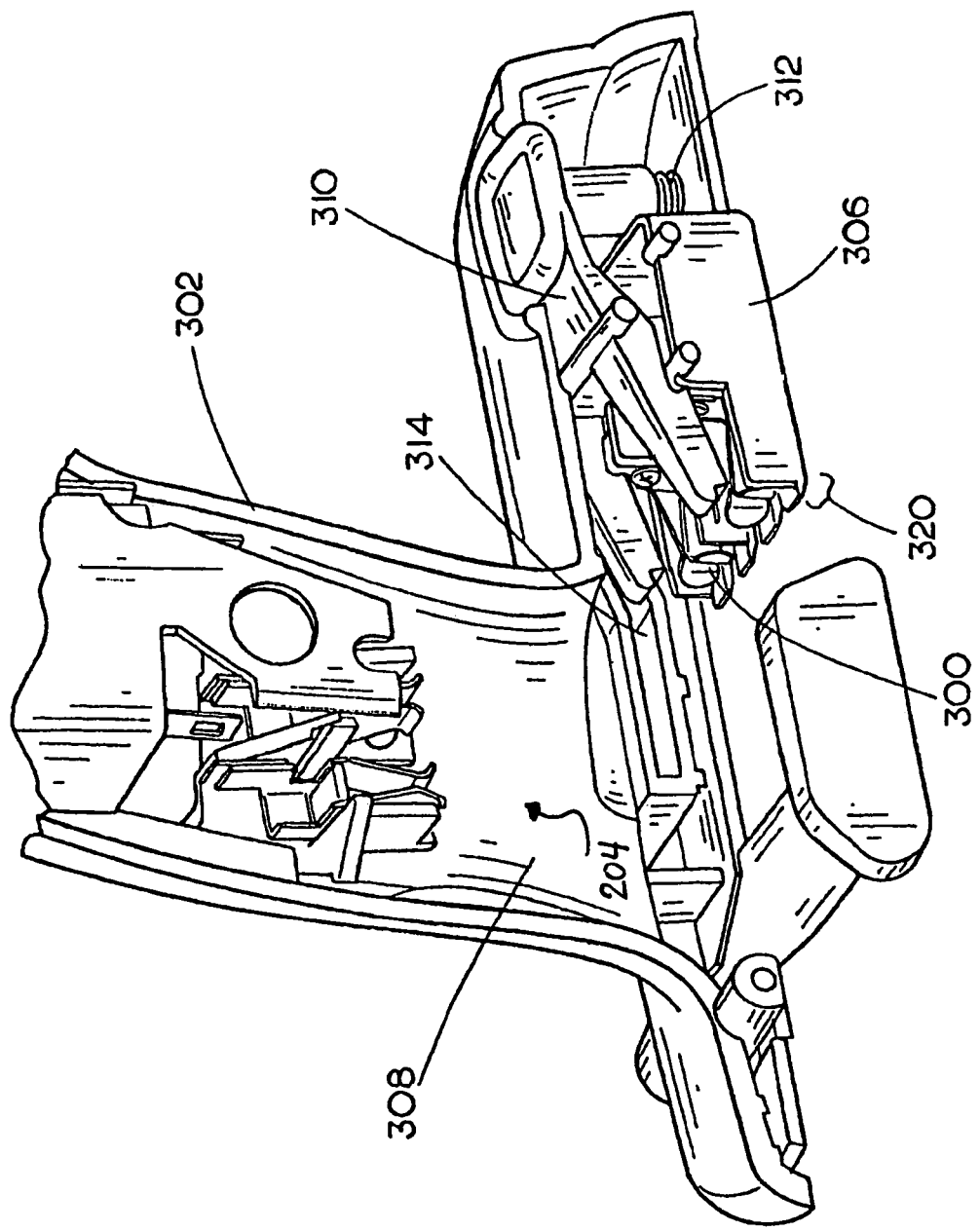
FIGS. 6A-6E are schematic views of a power drive with a flexible mounting feature according to another example, non-limiting embodiment of the present invention.
Figure 6B:
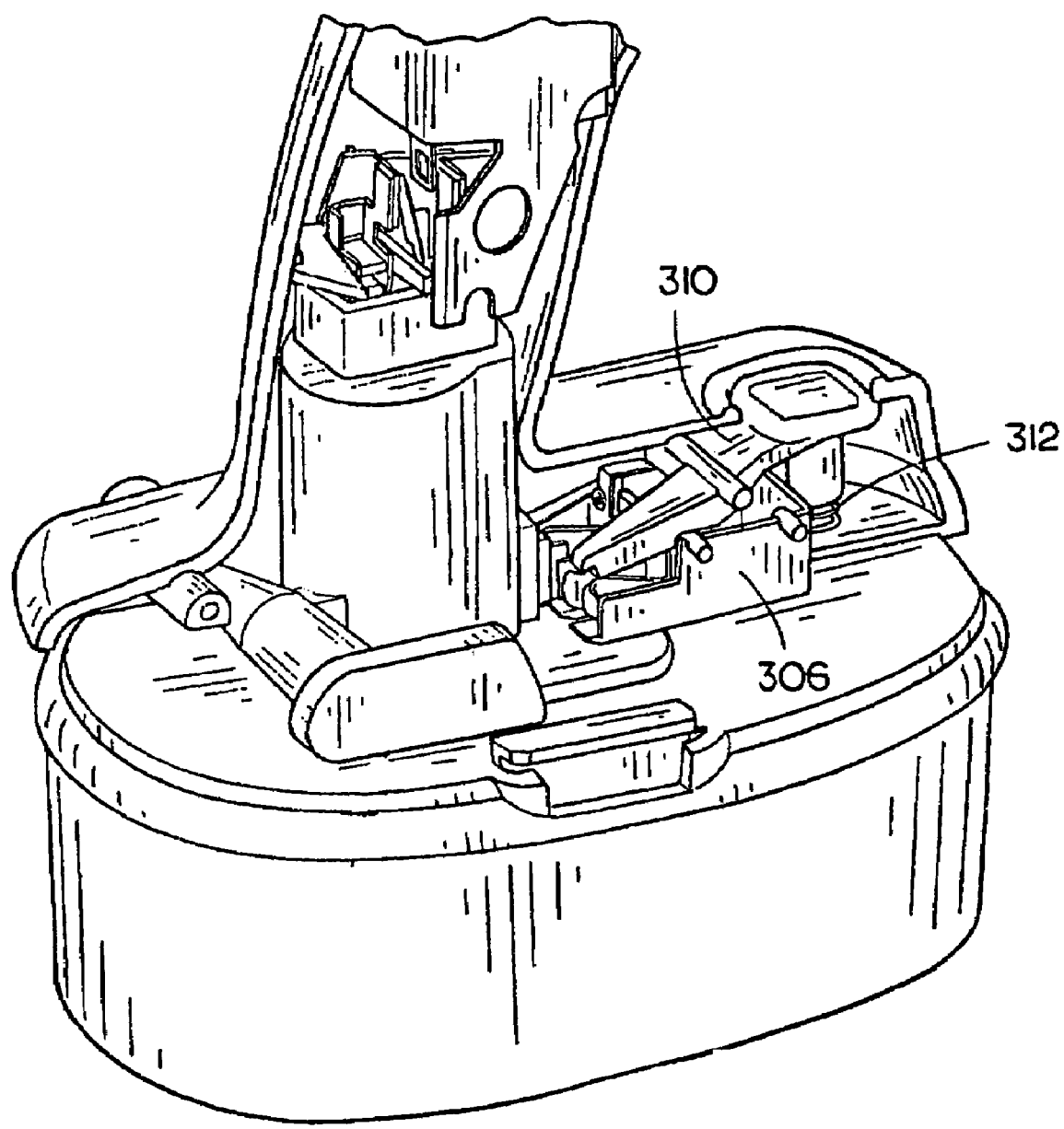
Figure 6C:
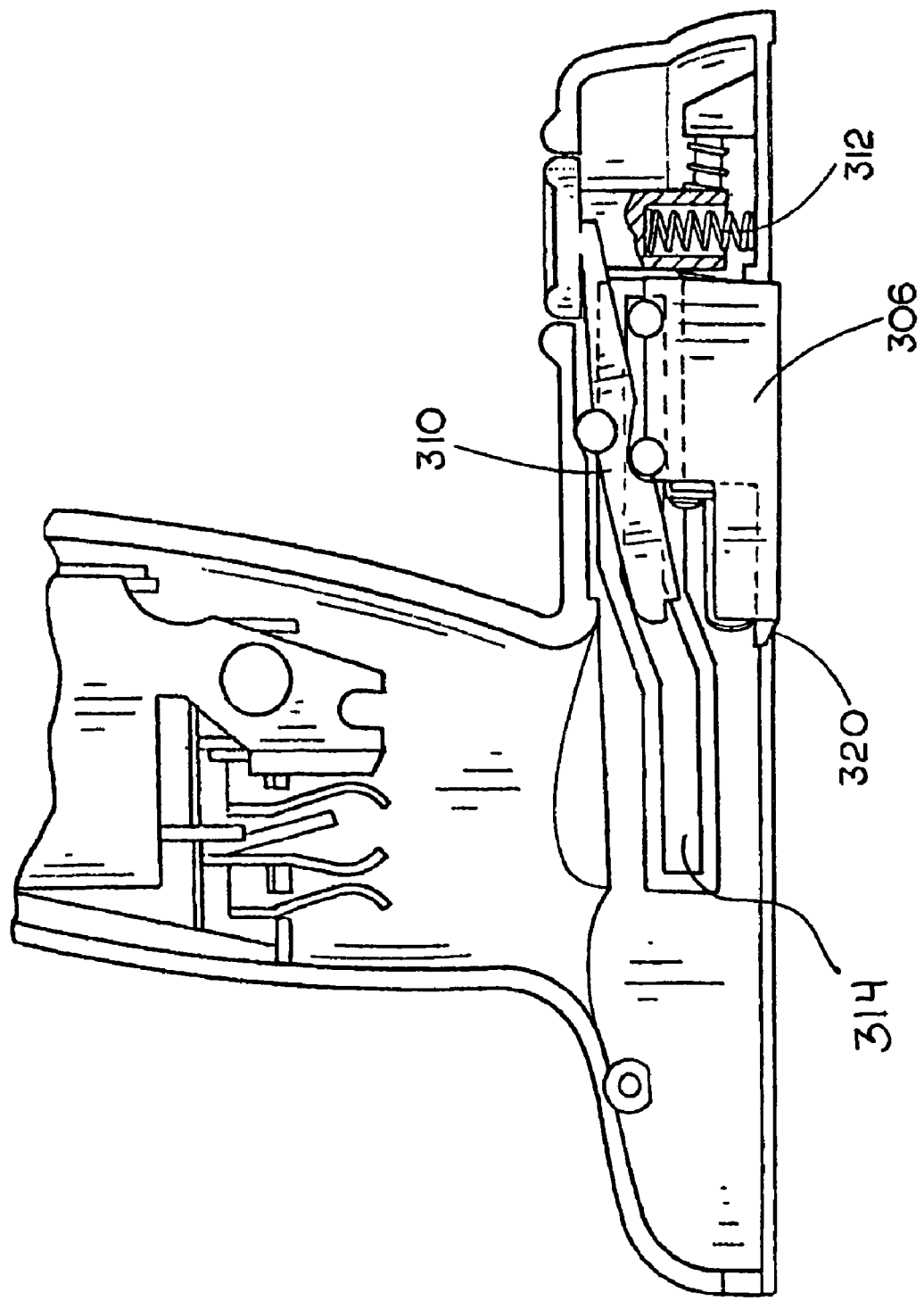
Figure 6D:
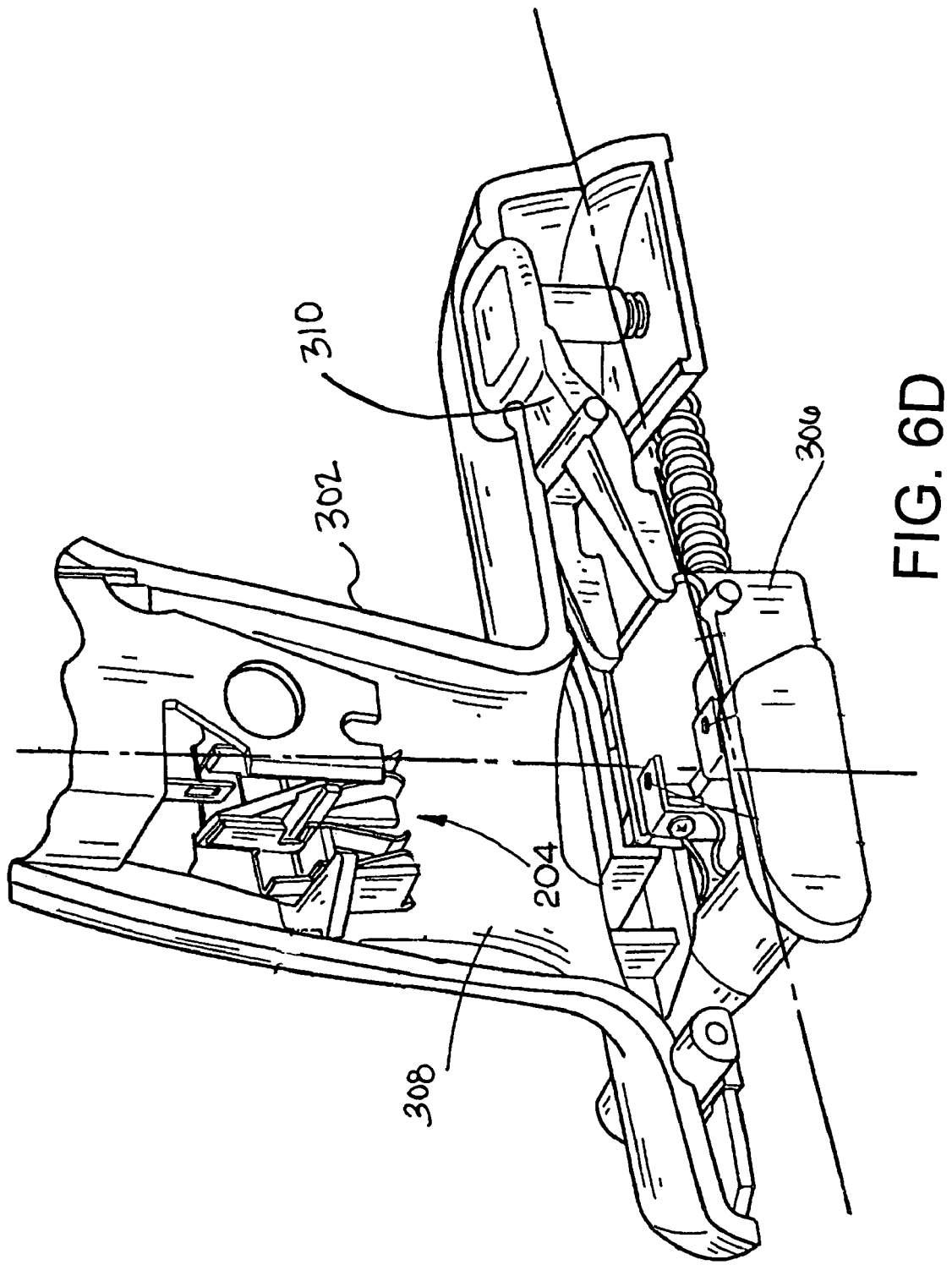
Figure 6E:
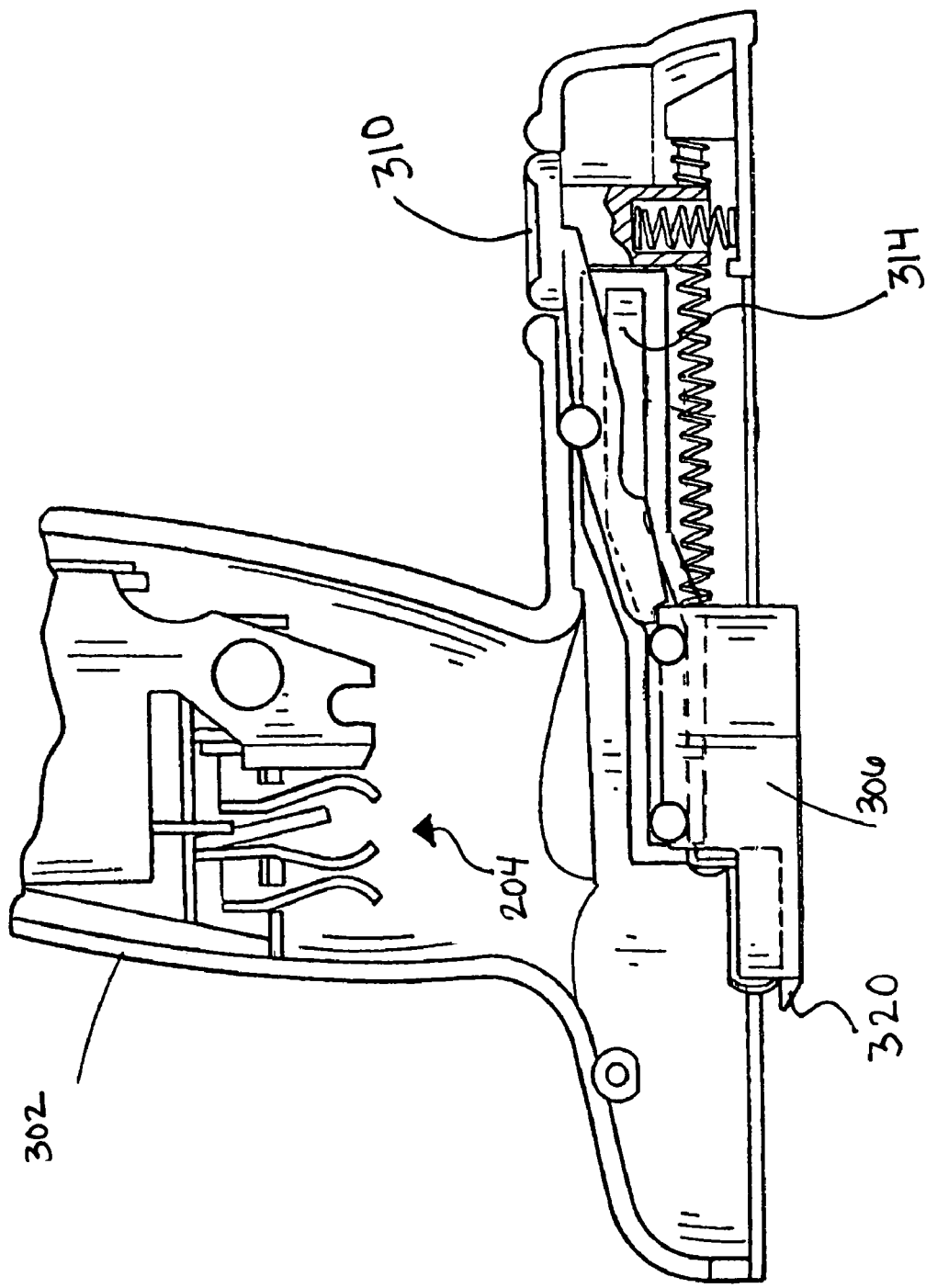

By way of example only, the terminal set 300 may be adjusted between a connecting position (See FIGS. 6D and 6E) suitable for electrically connecting with a rail type battery pack and a released position (See FIGS. 6A-6C) for permitting connection of a tower type battery pack to the terminal set 204. When the terminal set 300 is in the released position, a tower type battery pack may be inserted into the cavity 308, as shown in FIG. 6B.

The terminal set 300 may automatically adjust into the released position upon inserting the tower type battery pack into the cavity 308. For instance, an inclined surface 320 may be provided on a terminal set sub-housing 306. The inclined surface 320 may direct the terminal set 300 into the released position (FIG. 6A) upon sufficient insertion of a tower type battery pack such as to overcome a spring or biasing device aligned to bias the terminal set 300 into the contacting position.

The sub-housing 306 may include a protrusion or multiple protrusions for traveling in a groove 314 of the housing 302. In an alternative embodiment, a groove may be included in the sub-housing 306 for traveling on a rail of the housing 302. It will be appreciated that a variety of alternative alignment systems may be suitably implemented.

A locking mechanism may be provided to secure the adjustable terminal set 300 in position. For example, and with reference to FIGS. 6D and 6E, a locking latch 310 may engage the sub-housing 306 in the connecting position. The latch 310 may pivot to engage/disengage the sub-housing 306. The latch 310 may be biased into an engagement with the sub-housing 306. For instance, a spring 312 may influence the latch 310 to engage the sub-housing 306.

The latch 310 may also secure the terminal set 300 in the released position. For example, upon inserting a tower type battery pack, the latching mechanism may be overcome to release the terminal set from the connecting position. By way of example only, insertion of the tower type battery pack may cause the terminal set 300 to pivot sufficiently to disengage from the latch 310.

V. Example Battery Charger

FIG. 7

Figure 7:
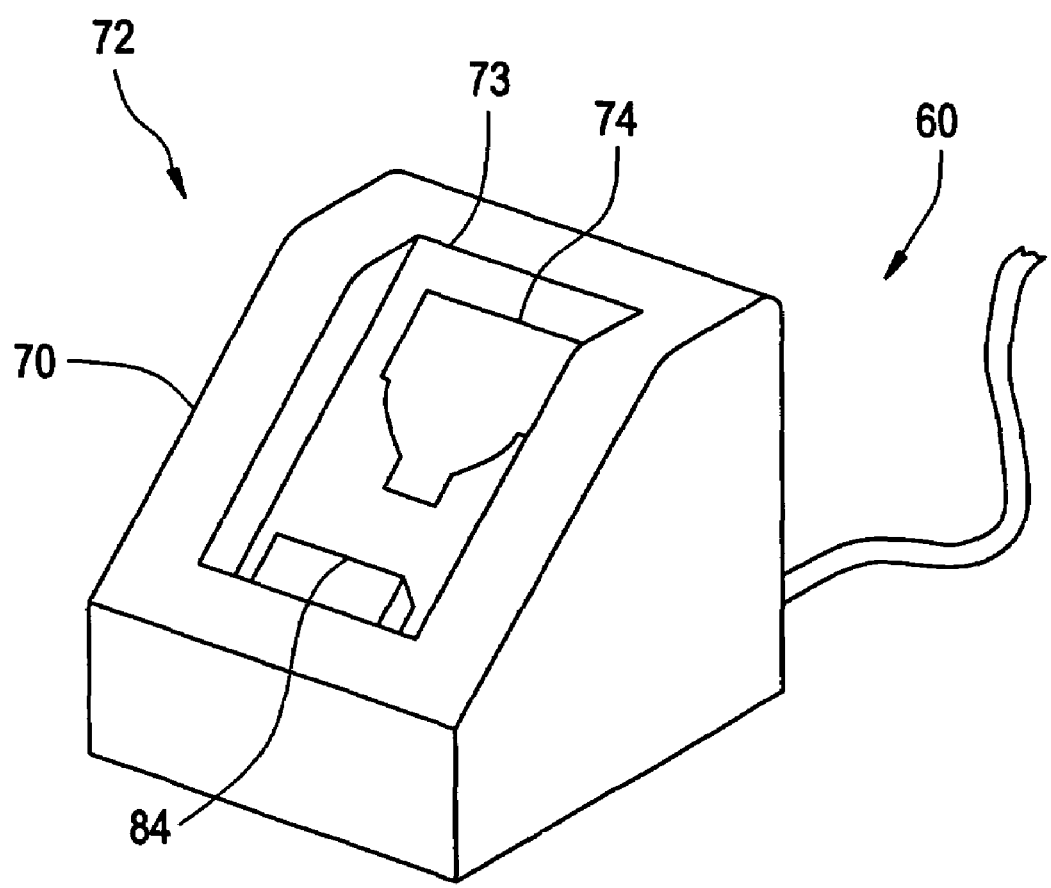
FIG. 7 is a schematic view of a battery charger with a flexible mounting feature according to an example, non-limiting embodiment of the present invention.

The example battery charger 60 depicted in FIG. 7 may include interface features that are somewhat similar to the ones of the example power driver discussed above in section II. For example, the battery charger 60 may have a circuit architecture in which a first terminal set and a second terminal set may be arranged in a parallel fashion. However there are several notable differences, as discussed below.

With reference to FIG. 7, the example battery charger 60 may include a housing 70. The housing 70 may have an interface 72 that facilitates interconnections (both mechanically and electrically) with battery packs having alternative configurations. By way of example only, the interface 72 may include a battery receiving port 73 having a combination of a tower interface portion and a rail interface portion, but the invention is not limited in this regard.

The tower interface portion may include a cavity 74, and a first terminal set (hidden from view in FIG. 7) may be provided in the bottom of the cavity 74. The tower interface portion may accommodate a battery pack having a tower configuration. Here, the nose portion of the battery pack may be inserted into the cavity 74. The nose portion may move far enough into the cavity 74 so that a battery terminal set engages with the first terminal set provided in the bottom of the cavity 74. In this way, the tower battery pack may become electrically connected to the internal circuitry of the battery charger 60. The tower battery pack may remain in the desired position via the force of gravity.

The rail interface portion may include a second terminal set 84 provided in the housing 70 toward the longitudinal end of the battery receiving port 73. The rail interface portion may accommodate a battery pack having a rail configuration. Here, the guide rails of the battery pack may enter into the battery receiving port 73. The battery pack 45 may move far enough into the battery receiving port 73 so that the battery terminal set engages with the second terminal set 84 provided on the housing 70. In this way, the rail battery pack 45 may become electrically connected (via the second terminal set 84) to the internal circuitry of the battery charger 60. The rail battery pack may remain in the desired position via the force of gravity.

In this example embodiment, when the tower battery pack is installed, the first terminal set may be active and the second terminal set 84 may be inactive. That is, the tower battery pack may be charged via current flowing through the first terminal set, but not through the second terminal set 84. And when the rail battery pack is installed, the second terminal set 84 may be active and the first terminal set may be inactive. That is, the rail battery pack may be charged via current flowing through the second terminal set 84, but not through the first terminal set.

In this example embodiment, the interface 72 may have a multi-chemistry feature. For example, the tower interface portion may be used to charge a battery pack having nickel-cadmium or nickel-metal-hydride battery cells, and the rail interface portion may be used to charge a battery pack having lithium ion battery cells. Here, the battery charger may employ an appropriate charging algorithm designed for the specific battery pack chemistry. To this end, additional terminals may be added to the first and the second terminal sets of the battery charger for sensing the presence of a battery pack having a specific chemistry.

Those skilled in the art will appreciate that a similar multi-chemistry feature may be suitably implemented in the example power driver discussed above in section II, where the tower interface portion may accommodate a battery pack having nickel-cadmium or nickel-metal-hydride battery cells, and the rail interface portion may accommodate a battery pack having lithium ion battery cells. Here, additional terminals may be added to the terminal sets 2, 4 for sensing the presence of a battery pack having a specific chemistry. Once the chemistry is known, the power driver operation may be altered to optimize driver performance for a given battery pack chemistry. For example, a lithium ion battery pack may have a different discharge current limit than a nickel-cadmium or nickel-metal-hydride battery pack. The driver control could adjust the discharge current so as to operate the power driver within the necessary limits of the battery pack.

The invention is not limited to the structural and functional details of the tower interface portion and the rail interface portion discussed above with reference to FIG. 7. For example, the tower interface portion and the rail interface portion may be provided in separate and distinct battery receiving ports (as opposed to the single battery receiving port 73). Further, the housing 70 may include a plurality of battery receiving ports 73.

What is claimed is:

1. A power driver comprising:
a housing; and
an electrical circuit supported by the housing;
wherein the electrical circuit includes at least two terminal sets forming physical interfaces, the physical interfaces located, at least in part, within a cavity formed by the housing, the at least two terminal sets including
a first terminal set located on the power driver configured for engagement along a first axis to a battery pack having a first configuration, and
a second terminal set located on the power driver and configured for engagement along a second axis to a battery pack having a second configuration.

2. The power driver according to claim 1, wherein the first axis is perpendicular to the second axis.

3. The power driver according to claim 1, wherein only one of the at least two terminal sets is engageable with a battery pack at a given moment in time.

4. The power driver according to claim 1, wherein the electrical circuit includes a motor.

5. The power driver according to claim 1, wherein the electrical circuit includes a switch.

6. The power driver according to claim 1, wherein the at least two terminal sets are arranged electrically in parallel with each other.

7. The power driver according to claim 1, wherein the housing includes rails respectively defining grooves, and one of the at least two terminal sets is located toward longitudinal ends of the grooves.

8. The power driver according to claim 1, wherein none of the at least two terminal sets is provided on an adapter that is releasably engageable with the housing.

9. The power driver according to claim 1, wherein the second terminal set is movably mounted on the housing.

10. The power driver according to a claim 9, wherein the second terminal set is configured to move between a connecting position and a released position.

11. The power driver according to claim 10, wherein the second terminal set is biased toward the connecting position.

12. A power driver comprising:
a housing; and
an electrical circuit supported by the housing;
wherein the power driver includes physical interface portions having
a first physical interface configured for engagement along a first axis to a battery pack having a first configuration, and
a second physical interface configured for engagement along a second axis to a battery pack having a second configuration, wherein the first and second interfaces are located at least in part, in a cavity in the housing.

13. The power driver according to claim 12, wherein the interface portions includes at least two terminal sets of the electrical circuit.

14. The power driver according to claim 12, wherein the first axis is perpendicular to the second axis.

15. A cordless drill comprising:
a housing; and
an electrical circuit supported by the housing;
wherein the electrical circuit includes
a motor,
a first interface located on the cordless drill and electrically coupled to the motor and configured for engagement along a first axis to a battery pack having a first configuration, and a second interface located on the cordless drill and electrically coupled to the motor and configured for engagement along a second axis to a battery pack having a second configuration, wherein the first and second interfaces are located within the housing.

16. The cordless drill according to claim 15, wherein the electrical circuit includes a switch.

17. The cordless drill according to claim 15, wherein the first axis is perpendicular to the second axis.

18. A battery charger comprising:
a housing; and
an interface having
a tower interface portion with a first terminal set that is electrically compatible with a tower battery pack having one of nickel-cadmium battery cells and nickel-metal-hydride battery cells, and
a rail interface portion with a second terminal set that is electrically compatible with a rail battery pack having lithium ion battery cells; the first terminal set and second terminal set configured so that when a battery is charging, one of the terminal sets is idle and not charging the battery.

19. The battery charger of claim 18, wherein the first and the second terminal sets are fixed to the housing.

20. The battery charger of claim 18, wherein the housing includes a single battery receiving port.

* * * * *